June 2, 1964  H. T. DEININGER, JR  3,135,854
METHOD FOR RESISTANCE WELDING GALVANIZED MATERIALS
Filed Dec. 28, 1962
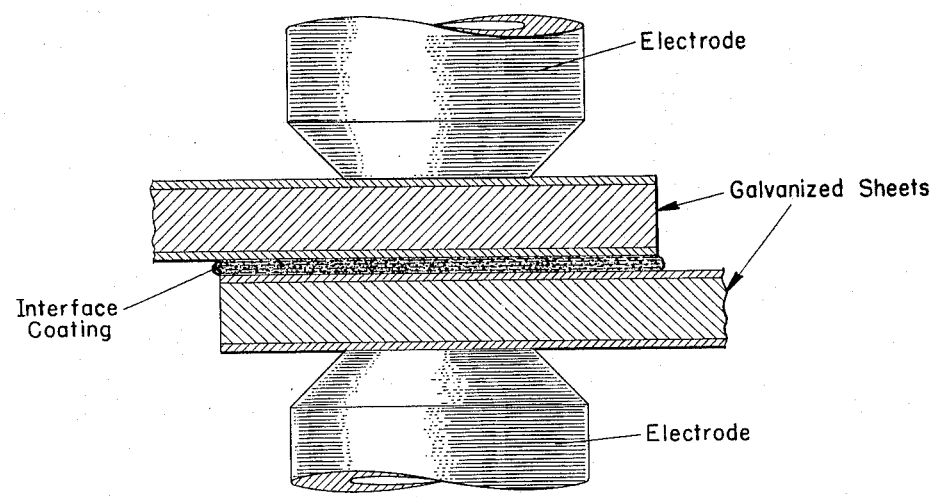
INVENTOR.
HARRY T. DEININGER, JR.
BY
*Douglas R. McKechnie*
ATTORNEY

United States Patent Office 3,135,854
Patented June 2, 1964

3,135,854
METHOD FOR RESISTANCE WELDING GALVANIZED MATERIALS
Harry T. Deininger, Jr., Cambridge, N.J., assignor to The Budd Company, Philadelphia, Pa., a corporation of Pennsylvania
Filed Dec. 28, 1962, Ser. No. 248,087
4 Claims. (Cl. 219—92)

This invention relates to a method for welding galvanized materials, and particularly, to a method for resistance welding galvanized steel sheets.

Resistance welding is a process for joining two or more parts by coalescing portions thereof as the result of the simultaneous application of pressure and an electric current. The process is particularly useful in welding sheet metals by employing spot welding techniques. In the usual form of spot welding, the parts to be joined are first placed between a pair of electrodes and the welding machine runs through a timed cycle commonly comprising squeeze, weld, hold and off periods. During the squeeze period, the electrodes clamp the parts together and develop a high pressure at their interface. Then, current is passed through the parts during the weld period to form a confined pool of molten metal. Thereafter, the current is turned off and the parts remain clamped together during the hold period until the molten pool solidifies and cools sufficiently to allow removal of the clamping force without cracking or weakening the weld. Then the electrodes are withdrawn to allow removal of the joined parts.

The path along which the current flows is composed of a plurality of different resistances, the highest being at the interface between the parts where heat is most rapidly developed so that the molten pool or weld nugget begins to grow at this point. The total heat generated in the parts is proportional to the product of the current squared times the resistance times the time of current flow.

Many industries, particularly the automotive industry, are increasing the use of galvanized steel sheets in place of uncoated steel sheets in order to benefit from the higher corrosion resistance of the galvanized material. However, because the interface resistance of galvanized parts is lower than for uncoated steel parts, the existing equipment and weld schedules are modified in accordance with prior art methods to either increase the current or the length of time of current flow so as to offset the decreased resistance.

Since resistance welding depends upon establishing a great temperature gradient to produce the confined pool of molten metal, and the gradient is established by the transient heat flow, the offsetting of the lower resistance is usually accomplished by increasing the current rather than the time. But this necessitates using higher capacity equipment and higher electrode pressures.

Accordingly, one of the objects of the invention is to provide an improved method for resistance welding galvanized materials.

Another object is to provide a method for resistance welding galvanized steel sheets by use of present equipment and weld schedules without requiring operation thereof at higher capacities.

The manner in which these and other objects are obtained can be best understood from the following description taken in connection with the accompanying drawing which is a schematic view facilitating an understanding of the invention, the view being of two parts clamped between a pair of electrodes, during the squeeze period, of a spot welding machine.

In accordance with the invention, galvanized steel sheets can be resistance welded in the following manner. First, one of the surfaces that is to form the interface between the parts is coated with a thin layer of oil as by spraying or brushing the oil onto the desired portions of the surface. Next, powdered mica is evenly applied onto the oil layer, as by dusting or sprinkling, to increase the interface resistance until it is the same in magnitude as that of the interface that would be formed between sheets of the uncoated base metal.

The exact amount of mica to be applied would usually be determined beforehand as by the following manner. First, the interface resistance of two pieces of uncoated (un-galvanized) base metal is determined. Next, the resistances of the two sheets or pieces of galvanized metals are determined. Then, the mineral oil is applied to one of the pieces and a small, measured amount of powdered mica is evenly dusted on the oil layer. Then the two parts are clamped together using a force equal to the electrode force and the interface resistance is measured. The procedure of dusting the mica and measuring is repeated until the interface resistance reaches the value of the interface resistance between parts of uncoated base metal and the amount of mica so determined is thereafter used.

The purpose of the mica is to increase the interface resistance whereas, although the dielectric properties of the oil contribute to increasing the resistance, the oil is primarily intended to act as a base for holding the powdered mica in place so that the parts can be handled. The powdered mica is very light, and in the absence of the oil layer, would be disturbed easily by slight air currents, jars or movements of the parts.

Next, the parts are spot welded by using a weld schedule which is the same as for corresponding parts formed of the uncoated base metal. One way to do this would be juxtapose the unjoined parts between the electrodes of a spot welding machine and run the machine through squeeze-weld-hold-off cycles. Under such circumstances, the parts would be first pressed together between the electrodes as shown in the drawing. Then, the parts would be heated to produce a confined pool of molten metal at the interface by passing an electric current between the electrodes. Afterwards, the current flow is shut off and the parts are held pressed together until the molten pool solidifies and cools allowing the pressure to be relieved without weakening the weld. Finally, the electrodes are moved apart and the joined parts removed.

While only a single embodiment has been described, it will be apparent to those skilled in the art that changes can be made in the details and arrangement of steps without departing from the scope of the invention as defined in the appended claims.

What is claimed is:

1. The method of joining two parts of galvanized sheets of ferrous metal, comprising the steps of: applying to the surface of one of the parts a uniform coating of oil and powdered mica held in place by the oil whereby the coating forms an interface resistance equal to that which would be formed between parts of uncoated base metal; juxtaposing the parts with the coating at the interface thereof; and resistance welding the juxtaposed parts.

2. The method of claim 1 wherein said resistance welding is spot welding.

3. The method of claim 1 wherein said coating is formed by first applying a coating of oil to said surface, and then sprinkling a uniform layer of powdered mica on the oil coating.

4. The method of joining two parts of galvanized sheet steel comprising the steps of: applying to one of the surfaces, which is to form the interface between the parts, a coating of powdered particles of electrical insulation material and a layer of mineral oil for holding the powdered particles in place, said coating forming an interface resistance equivalent to that of parts of uncoated base metal; juxtaposing the parts; and welding the parts by the simultaneous application of pressure and an electrical current.

References Cited in the file of this patent

UNITED STATES PATENTS

| | | |
|---|---|---|
| 1,770,540 | Lunn | July 15, 1930 |
| 2,726,308 | Cinamon | Dec. 6, 1955 |

FOREIGN PATENTS

| | | |
|---|---|---|
| 825,910 | France | Dec. 16, 1937 |